United States Patent
Haggard

(10) Patent No.: US 7,346,362 B2
(45) Date of Patent: Mar. 18, 2008

(54) METHOD FOR SENDING BATCH DOWNLOAD MESSAGES

(75) Inventor: Jonas Haggard, Bromma (SE)

(73) Assignee: Smarttrust AB, Stockholm (SE)

( * ) Notice: Subject to any disclaimer, the term of this patent is extended or adjusted under 35 U.S.C. 154(b) by 17 days.

(21) Appl. No.: 11/194,182

(22) Filed: Aug. 1, 2005

(65) Prior Publication Data

US 2006/0059243 A1 Mar. 16, 2006

(30) Foreign Application Priority Data

Sep. 14, 2004 (SE) .................................. 0402225

(51) Int. Cl.
*H04Q 7/20* (2006.01)
*H04L 12/26* (2006.01)

(52) U.S. Cl. .................... 455/466; 455/453; 370/230; 370/235

(58) Field of Classification Search ................ 455/453; 370/230, 235

See application file for complete search history.

(56) References Cited

U.S. PATENT DOCUMENTS

| | | | | |
|---|---|---|---|---|
| 5,444,438 A * | 8/1995 | Goldberg | ................... | 340/7.23 |
| 5,627,766 A * | 5/1997 | Beaven | ........................ | 702/122 |
| 5,644,706 A * | 7/1997 | Ruigrok et al. | ................ | 714/48 |
| 5,931,961 A * | 8/1999 | Ranganathan et al. | ...... | 714/712 |
| 2002/0007397 A1* | 1/2002 | Ouzounidis et al. | ......... | 709/206 |
| 2002/0091783 A1* | 7/2002 | Garland et al. | ............. | 709/207 |
| 2004/0058652 A1* | 3/2004 | McGregor et al. | ........ | 455/67.13 |
| 2004/0203606 A1* | 10/2004 | Souissi et al. | ........... | 455/412.1 |
| 2004/0260775 A1* | 12/2004 | Fedele | ......................... | 709/206 |
| 2005/0071508 A1* | 3/2005 | Brown et al. | ................ | 709/246 |

* cited by examiner

*Primary Examiner*—Charles N. Appiah
*Assistant Examiner*—Joel Ajayi
(74) *Attorney, Agent, or Firm*—Rolf Fasth; Fasth Law Offices

(57) ABSTRACT

The method of the invention for sending a message batch download in a telecommunication network comprising a sender entity, one or more receiver entities, and intermediate entities there between, is mainly characterized by creating a test message and sending the test message to each receiver, receiving an acknowledgement in case of a successful delivery of the test message sent, creating the real message to be sent to said receiver(s) and submitting the real message in batches.

9 Claims, 3 Drawing Sheets

METHOD FOR SENDING BATCH DOWNLOAD MESSAGES

PRIOR APPLICATIONS

Figure 1:
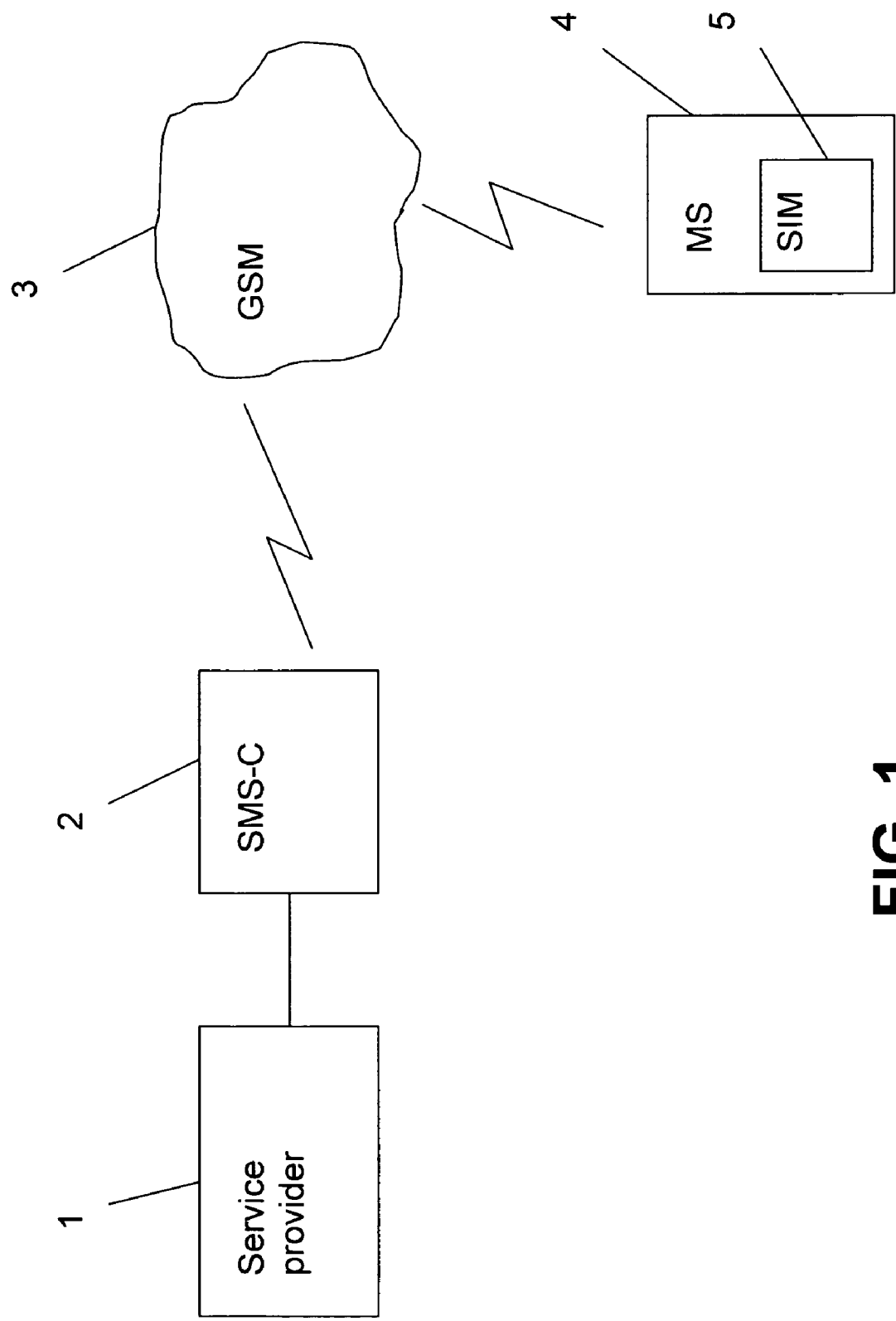

This is a U.S. national phase patent application that claims priority from Swedish Patent Application No. 0402225-7, filed 14 Sep. 2004.

TECHNICAL FIELD

The invention is concerned with a method for sending a batch download of messages in a telecommunication network.

BACKGROUND ART

The Global System for Mobile Communication (GSM) is a standard for digital wireless communications. GSM has different services, such as voice telephony. The Subscriber Identity Module (SIM) inside GSM phones was originally designed as a secure way to connect individual subscribers to the network but is nowadays becoming a standardized and secure application platform for GSM and next generation networks.

In the GSM system, Mobile Station (MS) represents the only equipment the GSM user ever sees from the whole system. It actually consists of two distinct entities. The actual hardware is the Mobile Equipment (ME), which consists of the physical equipment, such as the radio transceiver, display and digital signal processors. The subscriber information is stored in the Subscriber Identity Module (SIM), implemented as a Smart Card.

In addition to voice telephony, today's second-generation GSM networks deliver high quality and secure mobile voice and data services (such as SMS/Text Messaging) with full roaming capabilities across the world.

In mobile networks people can be contacted by calling to their mobile telephone number or by sending to that number a so called short message by e.g. making use of the Short Message Service (SMS). Short Message Service (SMS) is the transmission of short text messages to and from a mobile phone, fax machine and/or IP address. SMS messages must be no longer than 160 alphanumeric characters and contain no images or graphics. The point-to-point Short message service (SMS) provides a means of sending messages of limited size to and from GSM mobiles. Detailed information can be found in the ETSI standard GSM 03.40 Version 5.3.0.

The basic network structure of the SMS service comprises two entities, which may receive or send messages being the endpoints between which the SMS message is sent. The entity can be located in a fixed network, a mobile station or an internet protocol network.

Messages to and from mobile stations are received by a Short Message Service Center (SMSC), which then directs it to appropriate mobile device if the message is to be sent to a mobile station or it must generally direct it to a recipient.

There are many cases where an operator wants to download certain data to all its subscribers, such as different service downloads and Public Land Mobile Network (PLMN) updates. Examples of such updates are amending of the service center number when sending SMS messages, change of a PLMN to influence on the roaming, change of service provider name, settings for WAP or e-mail, telephone list updates and sending advertisements through SMS. The downloading is handled in batches where data is targeted to a certain group of cards in the form of large Over-the-Air (OTA) downloads of data to (U)SIM cards.

GSM has no broadcasting capability for broadcasting data, but must rely on a batch of single casts, where each receiver must be targeted individually, which sets great demand on the delivery system in terms of capacity and throughput.

When an operator wants to make a batch download, data will be sent to each receiver, which will create large queues in all intermediate parts of the network, such as in e.g. SMS-C, since such download messages usually have to be divided in several successive messages. The OTA downloads delivered to the customers might be quite large, ranging from 5 up to 30 SMs per subscriber, if a batch targets 100,000 subscribers. If e.g. a quarter of these are inactive, the number of queued SMs will be somewhere between 125,000 and 750,000 which will quite seriously affect the performance for other traffic. If the receiver is inactive the queues will be full for some time, degrading the performance until the payload is expired or the receiver is turned on.

THE OBJECT OF THE INVENTION

The object of the invention is to decrease the large queues in the intermediate entities when sending a batch download of messages.

SUMMARY OF THE INVENTION

The method of the invention for sending a batch download message in a telecommunication network comprising a sender entity, one or more receiver entities, and intermediate entities there between, is mainly characterized by creating a test message and sending the test message to each receiver, receiving an acknowledgement in case of a successful delivery of the test message sent, creating the real message to be sent to said receiver(s) and submitting the real message in batches.

The preferable embodiments of the invention have the characteristics of the sub claims.

The test message is either a part of the batch download message, whereby the test message and the real message together form the batch download message or the test message and the real message are separate messages.

All messages are sent via the intermediate entities, in some of which the test message is queued if the receiver is not listening. If the test message was not successfully submitted to the receiver and it was queued in an intermediate entity, an error message is sent by the intermediate entity in question to the service provider. The real message will not be sent until a successful test message sending takes place, why the content provider has to resend a test message in order to complete the process.

The telecommunication network is e.g. the GSM network, whereby one intermediate entity is the Short Message Service Centre (SMS-C) and the receiver is a SIM card in a mobile station. Another example of a telecommunication network is the UMTS network and the receiver is a USIM card in a mobile station.

As was presented in the prior art section, operators might need to download data in batches to mobile receivers, since one SMS message, with which the data is sent can only contain 160 characters. A lot of data will therefore be sent to each receiver, which in the prior art methods create large queues in all intermediate parts of the network, such as in e.g. SMS-C or in some intermediate entity in the service provider.

With the invention, only one message, i.e. the test message, will be sent to check that the receiver is active. While this may get queued due to an inactive receiver, the queue depth needed will be decreased as most of the payload consisting of several messages will not be sent in the first hand. The test message may have a different validity period (e.g. it can be very short in order to expire the messages quickly) than the rest of the download to further reduce the queues.

The invention will enhance the download performance by lessen the load on the network components in connection with the service provider and other network components such as the SMS-C. As only one Short Message (SM) will be sent to each subscriber before it is sure that they are listening the queues will be smaller. When the subscriber is listening for sure, the full payload will get delivered promptly.

Not only will the invention decrease the queues, but the creating of messages that never will never be delivered are also avoided, since this will take some load off from the functions in the service provider, who creates the specific short messages and from functions performing service management.

In the following, the invention will be described by means of some examples by referring to figures. The intention is not to restrict the invention to the details of the following presentation.

FIGURES

Figure 2:
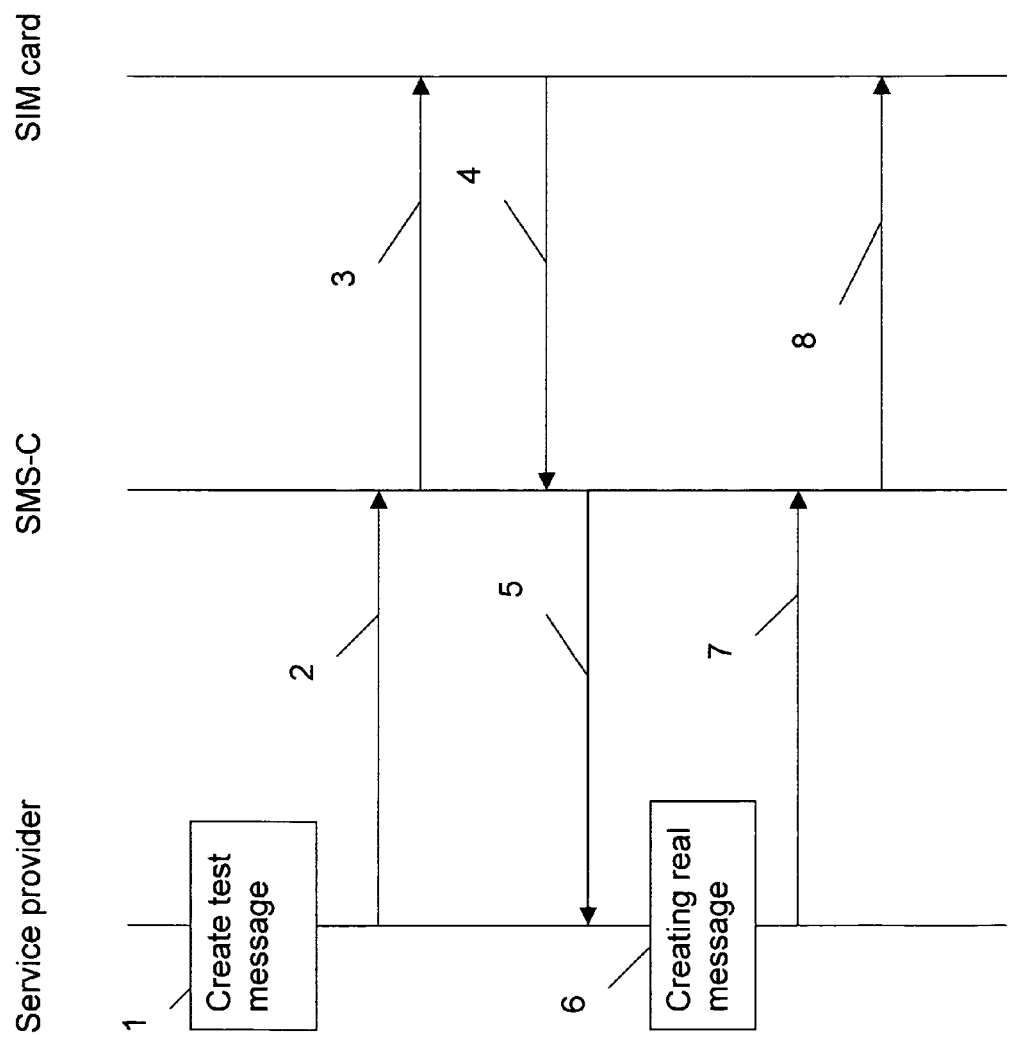
Figure 3:
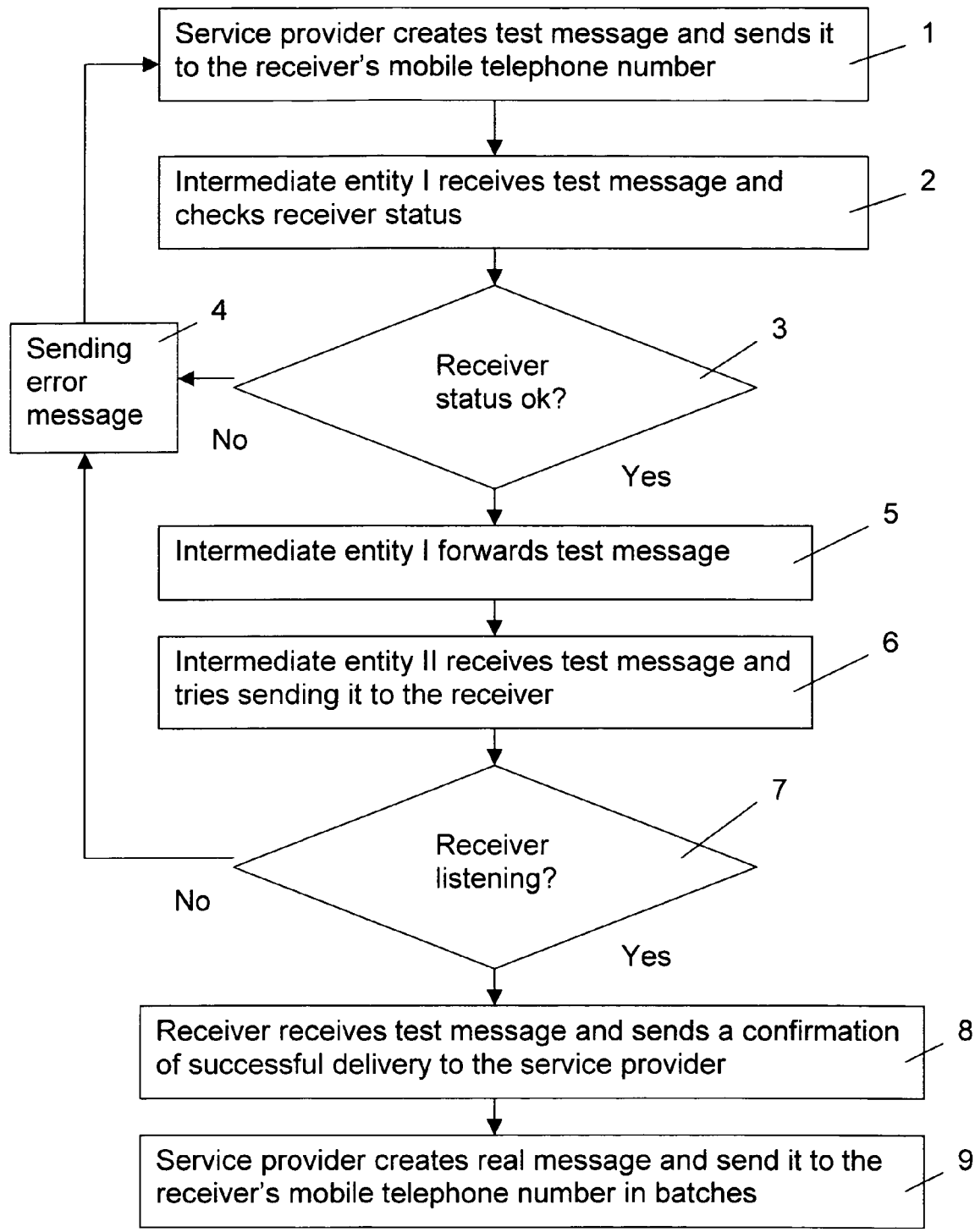

FIG. 1 is a view of an example of a network environment wherein the invention can be applied FIG. 2 is a signal diagram of an embodiment of the method of the invention in the case of successful delivery of the test message FIG. 3 is a flow diagram of the method of the invention it its whole

DETAILED DESCRIPTION

FIG. 1 is a view of an example of a network environment wherein the invention can be applied.

The intention is to submit a batch download message from a sender entity. The batch download message consists of several parts, and can be a batch update to be sent to the (U)SIM card of one or more mobile stations in e.g. a GSM network or UMTS. The downloading is handled in batches where data is targeted to a certain group of cards in the form of large Over-the-Air (OTA) downloads of data to (U)SIM cards.

The downloading form the sender entity may be originated from e.g. a service provider marked with reference number 1 in FIG. 1.

The managing of the downloading is product specific and depends on the vendor's solution. Usually, an application of the service provider performs the downloads, which are sent via some component that is responsible for creating correctly formatted short messages from the incoming requests from the application. This component might also handle chaining if possible and applies the correct security depending on card type. In some component of the service provider, applications may be stored for execution for later downloading. Also different formats of short messages are preferably managed. Finally, the management operations might include queuing of messages if more than one is intended for the same subscriber in order not to overflow the Short Message Service Center (SMSC).

The Short Message Service Centre (SMS-C) marked with reference number 2 in FIG. 1 dispatches the short messages to their destination. It will queue messages if the subscriber is not available and send it when the subscriber comes online again.

The GSM network itself is marked with reference number 3 in FIG. 1.

The messages are sent to the SIM card 5 of mobile stations (MS) 4 (only one shown in FIG. 1).

The basic idea of the invention is to make sure that the receiver is turned on and listening before sending the whole payload, since if the receiver is not listening, the payload, which might consist of several messages, is queued by SMS-C thereby causing traffic stocks. Therefore only a first short message command (SM) is sent first in the invention and waiting for a successful delivery is performed before sending the rest of the message. If the first command is not delivered successfully (i.e. expired or an error message is received) the rest of the payload is not sent.

FIG. 2 is a signal diagram of an embodiment of the method of the invention, wherein a successful delivery of the test message takes place. The example embodiment of FIG. 2 assumes that the telecommunication network, in which the method takes place is the GSM network.

The whole process might start with a request from a client for downloading data, or the operator makes take the initiative. If the data to be sent might only have the size of one short message, i.e. not more than 160 characters. In that case, all data is sent immediately. The invention applies to case, wherein the data to be sent has to be divided in several messages.

In FIG. 2, the service provider is creating a test message in step 1 of FIG. 2 after having noted that the data to be sent is more than one message. This test message can be an alert message separate from the real message to be sent later or it can be a part of the batch download message, such as the first batch of the total message.

Advantageously, the test message is a PING command. PING is short for Packet InterNet Groper and it is used to verify if a network data packet is capable of being distributed to an address without errors. The ping utility is commonly used to check for network errors. Basically, Ping is an Internet program for verifying that a particular IP address exists and can accept requests. The verb ping means the act of using the ping utility or command. Ping is used diagnostically to ensure that a host computer you are trying to reach is actually operating. If, for example, a user can't ping a host, then the user will be unable to use the File Transfer Protocol (FTP) to send files to that host. If there is an error in the delivery to the destination, the ping command displays an error message.

Ping can also refer to the Acknowledgement Code (ACK). This is done before sending e-mail in order to confirm that all of the addresses are reachable.

In creating the test message, the invention advantageously makes use of the PING command technology.

The test message is then sent to the SIM card of a mobile station via the SMS-C as signals 2 and 3. If successful delivery of the message is informed to the service provider by the mobile station via the SMS-C as signals 4 and 5, the real message is now created by the service provider as step 6 of FIG. 2. The real message is then submitted in batches to the SIM card of the mobile phone via the SMS-C in signals 7 and 8. Signals 7 and 8 illustrates here all the successive signals, which can be several or only these two, needed to send the real messages in batches.

FIG. 3 is a flow diagram of the method of the invention it its whole. Also here it is assumed that the telecommunication network is the GSM network.

In FIG. 3, the service provider creates the test message, e.g. a ping command, in step 1. The test message is then sent to the SIM card of a mobile station via possible intermediate entities and the SMS-C. Some functions of these intermediate entities are explained in connection with FIG. 1. They are in connection with this figure called intermediate entity I collectively. In step 2, the test message is received by intermediate entity I. Some of these intermediate entities included in intermediate entity I preferably checks the status of the mobile station the test message is intended to be sent to, with respect to telephone number, status etc.

If according to the checked status, the telephone number used is not working or something else is wrong in, which is checked in step 3, an error message is sent to the service provider in step 4. But if no hinder exists, and the receiver status is ok according to step 3, the test message is forwarded by the intermediate entity I to intermediate entity II in step 5, which is the SMS-C, for example when it is question about the GSM network. Intermediate entity II then starts sending of the test message to the SIM card of the mobile station in step 6. If the receiver is not listening, the intermediate entity II sends an error message, like that in step 4, to the service provider, which has to start the whole process over again. If the receiver is listening, then it receives the test message and sends a confirmation message to the service provider in step 8. The service provider then creates the real message and sends it to the receiver's SIM card in batches in step 9.

As was stated earlier, the test message can be an alert message separate from the real message to be sent later or it can be a part of the batch download message, such as the first batch of the total message. When the test message is a PING command, there is no need to create a special ping request; also in that case it could be the first part of the large download. If it is a part of the larger download no time is wasted to do extra short messages or the ping.

The invention claimed is:

1. A method for sending a message in a telecommunication network, comprising:

providing a telecommunication network having a sender entity, one or more receiver entities and intermediate entities therebetween;

determining a size of a real message and comparing the size with a reference size;

when the size of the real message is smaller than the reference size, sending the real message to a first receiver entity, a second receiver entity and a third receiver entity without first creating and sending a test message;

when the size of the real message is larger than the reference size, creating a test message and sending the test message to the first receiver entity, the second receiver entity and to the third receiver entity, the sender entity receiving an acknowledgement from the first and second receiver entities in case of a successful delivery of the test message sent, and the sender entity sending the real message only to the first and second receiver entities from which an acknowledgement of successful delivery of the test message has been received.

2. The method of claim 1, wherein the method further comprises the test message and the real message together forming the batch download message.

3. The method of claim 1, wherein the test message and the real message are separate messages.

4. The method of claim 1, wherein the method further comprises queuing the test message in one of the intermediate entities when a receiver entity is not listening.

5. The method of claim 4, wherein an error message is sent by an intermediate entity to a service provider if the test message was not successfully submitted to the receiver.

6. The method of claim 1, wherein the telecommunication network is a GSM network, one intermediate entity is a Short Message Service Center (SMS-C) and one receiver entity is a Subscriber Identity Module (SIM) card in a mobile station.

7. The method of claim 1, wherein an intermediate entity, in which the test message is queued when a receiver entity is not listening, is in a service provider.

8. The method of claim 1, wherein the telecommunication network is an UMTS network and one receiver entity is a USIM card in a mobile station.

9. The method of claim 1 wherein the method further comprises sending the real message in batches.

* * * * *